Dec. 29, 1931. H. W. LANGBEIN 1,838,414
METHOD OF TESTING BRAKES
Original Filed Oct. 29, 1925
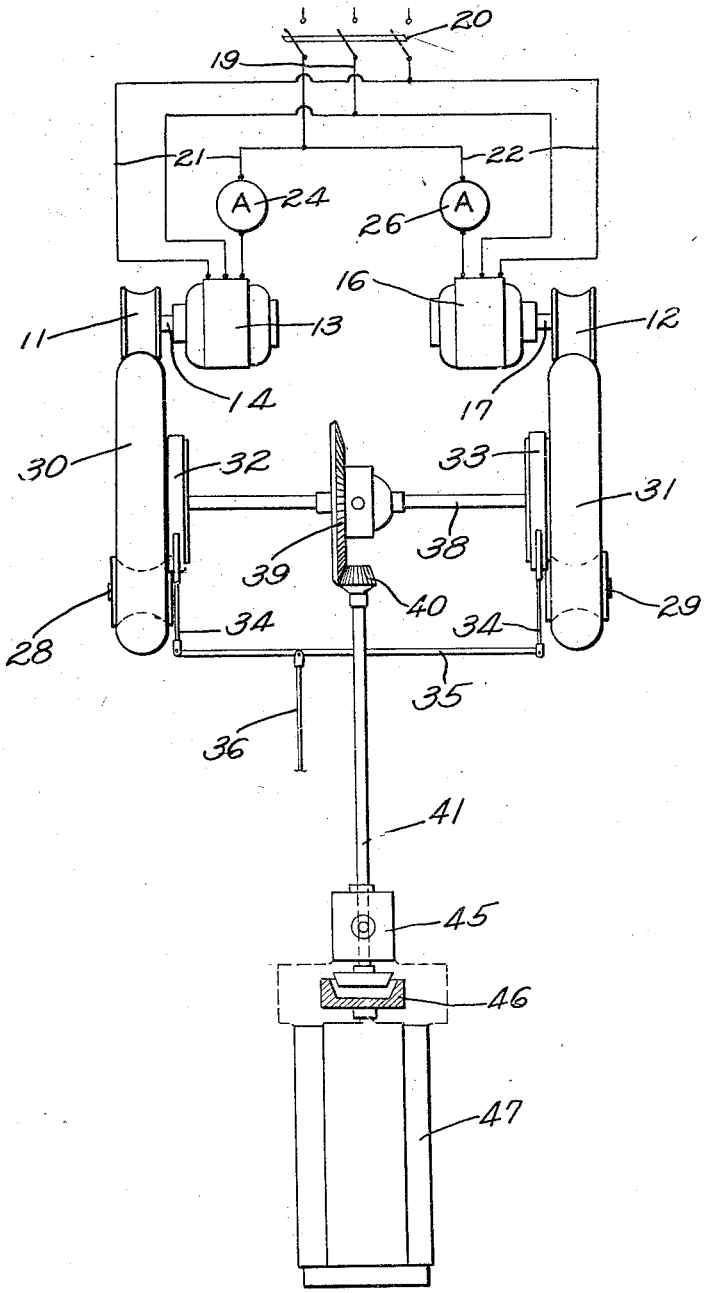
INVENTOR:
HAROLD W. LANGBEIN
BY
Ford W. Harris
ATTORNEY.

Patented Dec. 29, 1931

1,838,414

UNITED STATES PATENT OFFICE

HAROLD W. LANGBEIN, OF LOS ANGELES, CALIFORNIA

METHOD OF TESTING BRAKES

Original application filed October 29, 1925, Serial No. 65,604. Divided and this application filed September 26, 1927. Serial No. 221,955.

My invention relates to the testing of brakes of automotive vehicles and is a division of my patent entitled Brake testing machine, No. 1,746,780 granted February 11, 1930.

The brakes of vehicles operating on different wheels must all have the same braking pressure or else they will not all do the same amount of work and arrest the motion of the vehicle in a proper manner. The ordinary method of adjusting the brakes is substantially as follows: The mechanic will first tighten each brake using as much care as possible to tighten them both the same amount. He then takes the automobile out on the road and skids the wheels. If one tire is skidded a greater length than the other, the operator then tightens the brake on the wheel which is skidded the least. This procedure is repeated until both of the wheels are skidded the same amount. Not only does this take considerabl time but it is unsatisfactory inasmuch as it places quite a strain on the tires of the wheels.

It is an object of my invention to provide a method whereby the amount of pressure applied by each brake may be ascertained in a shop and while the vehicle is stationary.

A further object of the invention is to provide a method of this character in which the pressure applied by each brake is ascertained by observing the energy required to drive the wheels on which the brakes are mounted.

Other objects and advantages of the invention will be made evident in the following description.

My invention may be best understood by referring to the diagrammatic drawing in which 11 is a first rotor or wheel, and 12 is a second rotor or wheel. The first rotor is operated by means of a first motor 13 having a shaft 14 on which the first rotor is mounted. The second rotor 12 is operated by a second motor 16 having a shaft 17 on which it is mounted. The first and second motors 13 and 16 are preferably three phase induction motors which have been accurately tested and balanced as to characteristics so as to respond as nearly as possible in identically the same manner to a given current. Moreover, each of these motors draws current in identically the same relation to the load placed upon it as does the other motor. The first and second motors are supplied with electricity by a main circuit 19 having a main switch 20. Connected in parallel to the main circuit 19 is a first circuit 21 and a second circuit 22. The first circuit 21 includes a first ammeter 24 and the second circuit 22 includes a second ammeter 26; idler rollers 28 and 29 are provided in radial alignment with the rotors 11 and 12 respectively. This constitutes all the mechanism which is necessary to determine the amount of pressure applied by the brakes of an automotive vehicle. It should be understood that this drawing is very diagrammatic and shows the simplest form of construction. I wish it to be understood that for carrying out the method of my invention other forms of equivalent apparatus may be used.

When adjusting the brakes of a vehicle the rear wheels 30 and 31 are supported by the first and second rotors respectively and the corresponding idler rollers 28 and 29. The wheels 30 and 31 have brakes 32 and 33 which are connected by connectors 34 to an equalizing bar 35. The equalizing bar 35 is connected by a pull-rod 36 to the brake lever of the vehicle, not shown. Both wheels 30 and 31 are driven by an axle 38 having a differential 39. The differential 39 has a pinion 40 which is driven by a drive shaft 41. The drive shaft 41 is connected to a transmission 45 which is in turn connected to a clutch 46 by means of which it is associated with an engine 47 of the vehicle.

After the vehicle has been driven into such a position that the wheels 30 and 31 rest on the rotors 11 and 12, the front wheels are blocked so that there will be no possibility of the vehicle moving. The transmission is then thrown into neutral or the clutch is disengaged as shown, so that the wheels 30 and 31 will be free to rotate. The main switch 20 of the main circuit 19 is then closed so that the first and second motors 13 and 16 are energized. The first and second rotors are thus rotated and the wheels 30 and 31 are driven thereby. The brakes are now applied by operating the brake lever which pulls forwardly on the pull-rod. If the brakes are uneven, one of them will exert more pressure than the other. Take, for example, when the brake 32 exerts more pressure than the brake 33, a greater load will be placed on the first motor 13 than is placed on the second motor 16. For this reason more power will be required to operate the first motor 13 than is required to operate the second motor 16, and therefore the first ammeter 24 will have a greater reading than the second ammeter 26. The apparatus is then temporarily shut down, and the brake 33 is then adjusted in order to cause it to exert as much pressure as the brake 32. The apparatus is then again set into operation. The brakes are then applied. The brake 33 will undoubtedly exert more pressure than it did before. After the operator has adjusted it sufficiently to cause it to exert as much pressure as the brake 32, then the two ammeters will correspond in reading and the operator will know that both brakes are exerting the same pressure.

The apparatus shown in the drawing is very simple to operate and makes it possible to adjust brakes in a minimum of time. The apparatus illustrated in the drawing is very suitable for carrying out the method of the invention which consists in driving the wheels of a vehicle by applying the brakes and observing the energy consumed.

I claim as my invention:

1. A method of mutually adjusting two brakes of a motor vehicle comprising: driving at substantially the same velocity the wheels on which the brakes are situated by separate sources of power independent of the engine of the vehicle; applying said brakes; observing the energy consumed by said sources of power; and adjusting said brakes so that the energy consumed in driving one of said wheels is equal to that consumed in driving the other of said wheels.

2. A method of mutually adjusting two brakes of a vehicle, said method comprising: supplying electric energy to separate sources of power to drive the respective wheels associated with said brakes; applying said brakes; observing the rate of current consumption of said sources while driving said wheels against the resistance of said brakes; and adjusting the brakes until the current consumption rates of both power sources are brought to desired values.

3. A method of determining the comparative braking efficiencies of a plurality of brakes on the wheels of a vehicle, said method comprising: simultaneously driving the respective wheels at substantially the same velocity by separate sources of power; simultaneously applying said brakes; and observing the energy consumed by said sources of power while driving said wheels against the resistance of said brakes.

4. A method of determining the comparative braking efficiencies of a plurality of brakes on the wheels of a vehicle, said method comprising: supplying electric energy to separate sources of power to drive the respective wheels associated with said brakes; applying said brakes; and observing the rate of current consumption of said sources while driving said wheels against the resistance of said brakes.

5. A method of determining the comparative braking efficiencies of a plurality of brakes on the wheels of a vehicle, said method comprising: supplying electric energy of a given voltage to separate sources of power to drive the respective wheels associated with said brakes; applying said brakes; and observing the rate of current consumption of said sources while driving said wheels against the resistance of said brakes.

6. A method of mutually adjusting two brakes of a motor vehicle, comprising: driving the wheels on which the brakes are situated by independently operated sources of power; applying said brakes; observing the energy consumed by said sources of power; and adjusting said brakes so that the energy consumed in driving one of said wheels is equal to that consumed in driving the other of said wheels.

7. A method of determining the comparative braking efficiencies of a plurality of brakes on the wheels of a vehicle, said method comprising: simultaneously driving the respective wheels by independently operated sources of power; simultaneously applying said brakes; and observing the energy consumed by said sources of power while driving said wheels against the resistance of said brakes.

In testimony whereof, I have hereunto set my hand at Los Angeles, California, this 17th day of September, 1927.

HAROLD W. LANGBEIN.